United States Patent
Nakashima et al.

(10) Patent No.: US 7,864,065 B2
(45) Date of Patent: *Jan. 4, 2011

(54) BATTERY RESIDUAL QUANTITY DISPLAY METHOD AND ELECTRONIC EQUIPMENT

(75) Inventors: Ryoichi Nakashima, Tokyo (JP); Hideyuki Sato, Chiba (JP); Yukio Tsuchiya, Kanagawa (JP); Kazuyasu Nawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/037,714

(22) Filed: Feb. 26, 2008

(65) Prior Publication Data

US 2008/0150477 A1   Jun. 26, 2008

Related U.S. Application Data

(63) Continuation of application No. 10/587,256, filed as application No. PCT/JP2006/302946 on Feb. 20, 2006.

(30) Foreign Application Priority Data

Mar. 10, 2005  (JP) .............................. 2005-067818

(51) Int. Cl.
    *G08B 21/00* (2006.01)
(52) U.S. Cl. ..................................... 340/636.1; 320/106
(58) Field of Classification Search ........................ None
    See application file for complete search history.

(56) References Cited

U.S. PATENT DOCUMENTS

| | | | | |
|---|---|---|---|---|
| 5,455,499 | A * | 10/1995 | Uskali et al. ............. | 340/636.1 |
| 5,717,307 | A * | 2/1998 | Barkat et al. ............. | 340/636.1 |
| 5,825,155 | A | 10/1998 | Ito et al. | |
| 6,211,644 | B1 * | 4/2001 | Wendelrup et al. .......... | 320/106 |
| 2003/0069485 | A1 | 4/2003 | Konishi et al. | |
| 2003/0118183 | A1 * | 6/2003 | Struyk ........................ | 380/213 |
| 2004/0212349 | A1 * | 10/2004 | Tsuchiya et al. ............ | 320/132 |
| 2005/0001589 | A1 | 1/2005 | Edington et al. | |
| 2005/0001629 | A1 | 1/2005 | Chen | |

(Continued)

FOREIGN PATENT DOCUMENTS

JP          03 36977          4/1991

(Continued)

*Primary Examiner*—Daniel Wu
*Assistant Examiner*—Brian Wilson
(74) *Attorney, Agent, or Firm*—Oblon, Spivak, McClelland, Maier & Neustadt, L.L.P.

(57) ABSTRACT

A battery pack detachably connectable to an equipment body to supply power to the equipment body, the battery pack including a battery cell, a microcomputer for communicating with the equipment body, a connection terminal connected to the microcomputer, a positive power supply input terminal connected to a cathode of the battery cell; and a negative power supply input terminal connected to an anode of the battery cell. After the power of the equipment body is turned on, the microcomputer alternately sends to the equipment body by serial communication via the connection terminal information to be used in authentication processing executed by the equipment body and information to be used in a battery residual quantity count executed by the equipment body. After the authentication processing is complete, the microcomputer sends to the equipment body information to be used in updating the battery residual quantity count executed by the equipment body.

14 Claims, 4 Drawing Sheets

U.S. PATENT DOCUMENTS

2006/0064001 A1 3/2006 Barbour
2007/0112259 A1 5/2007 Tateda et al.

FOREIGN PATENT DOCUMENTS

| JP | 3-36977 | 4/1991 |
| JP | 7 230344 | 8/1995 |
| JP | 8 265984 | 10/1996 |
| JP | 09-297166 | 11/1997 |
| JP | 2002-223537 | 8/2002 |
| JP | 2002 223537 | 8/2002 |
| JP | 2004-147408 | 5/2004 |
| JP | 2004-310387 | 11/2004 |
| JP | 2005 51964 | 2/2005 |
| WO | WO 2006/100685 A2 | 9/2006 |

* cited by examiner

BATTERY RESIDUAL QUANTITY DISPLAY METHOD AND ELECTRONIC EQUIPMENT

CROSS REFERENCE TO RELATED APPLICATIONS

This application is a continuation of U.S. application Ser. No. 10/587,256, filed on Jul. 26, 2006, and is based upon and claims the benefit of priority to International Application No. PCT/JP06/302946, filed on Feb. 20, 2006 and from the prior Japanese Patent Application Nos. 2005-067818 filed on Mar. 10, 2005. The entire contents of each of these documents are incorporated herein by reference.

FIELD OF THE INVENTION

The present invention relates to a battery residual quantity display method in an electronic equipment comprising an equipment body within which a microcomputer having communication function is mounted, and a battery pack detachably loaded at the equipment body and adapted so that a microcomputer having communication function to perform serial communication to and from the microcomputer of the equipment body side is mounted, the battery pack serving to supply power to the equipment body, and an electronic equipment using such a display method.

BACKGROUND OF THE INVENTION

Hitherto, there are used electronic equipments, e.g., image pick-up apparatuses such as video camera and/or digital still camera, mobile telephone, and/or personal computer, etc. using, as power supply, battery pack where a secondary battery such as lithium ion battery, NiCd battery or nickel-hydrogen battery, etc. is included.

In the battery pack used in electronic equipments of this kind, there are included therewithin, e.g., a microcomputer for performing residual quantity calculation of the battery, and/or communication to and from the electronic equipment using such battery pack as a power supply, peripheral circuits of the microcomputer, and a circuit for detecting the state of battery cell, which is necessary for performing residual quantity calculation of battery, etc. As a battery pack of this kind, there is a battery pack described in the Japanese Patent Application Laid Open No. 1997-297166 publication.

Moreover, portable or mobile information processing apparatuses such as PDA (Personal Digital Assistant), etc. have network connecting function, whereby there is performed user authentication processing to confirm that concerned user is authorized user in order to comply with electronic settlement using such network connecting function with enhancement of processing ability. For example, there is performed, e.g., a method of performing communication of information relating to authentication between charging unit and control means within the mobile information processing apparatus to protect personal information and secret information, which are stored within the mobile information processing apparatus, on the basis of result of the authentication confirmation. As an equipment having a function of this kind, there is an equipment described in the Japanese Patent Application Laid Open No. 2004-310387 publication.

DISCLOSURE OF THE INVENTION

Problems to be solved by the invention

Meanwhile, in electronic equipments using, as a power supply, battery pack within which secondary battery is included, there are many cases where battery packs dedicated therefor are used every equipment. When battery pack dedicated for corresponding equipment is not used, there results a cause to lead breakage/damage, etc. of the equipment body.

Moreover, hitherto, in the case of performing communication of information between charging unit and control means within mobile information processing apparatus to perform authentication of battery, authentication processing of battery is performed prior to other processing so that when battery authentication processing is not completed, it is impossible to perform other processing.

Further, even in the case of the same battery, authentication of the battery is performed every time before other processing is performed after power is turned ON.

Hitherto, since authentication processing of batteries used in electronic equipments of the same kind are collectively performed, a person who attempts to prepare non-genuine battery facilitates to analyze a method of authentication of battery. Further, loads of microcomputer of the set side (equipment body) and microcomputer of the battery side are great, and microcomputer operative at a high speed is required so that cost is increased. Moreover, as stated above, loads of microcomputers of the set side and the battery side are great. As a result, it is necessary to operate the microcomputer at a high speed so that power consumption is disadvantageously increased.

Moreover, in conventional battery packs, only either one of the battery residual quantity display function and the battery authentication processing function is provided. In order to have both functions to perform, at the same time, battery residual quantity display and battery authentication processing, two independent communication systems of the set and the battery are required. As a result, communication lines of two systems are required so that cost of the hardware is increased. In addition, communication drivers of two systems are required so that development cost of software is disadvantageously increased.

In view of the above, an object of the present invention is to provide a battery residual quantity display method and an electronic equipment, which are capable of providing both functions of battery residual quantity display and battery authentication processing without increasing load of the microcomputer.

The present invention is directed to a battery residual quantity display method in an electronic equipment comprising an equipment body within which a microcomputer having communication function is mounted, and a battery pack detachably loaded at the equipment body and adapted so that a microcomputer having communication function to perform serial communication to and from the microcomputer of the equipment body side is mounted, the battery pack serving to supply power to the equipment body. In this method, when power is turned ON, the microcomputer of the equipment body side serves to first acquire, by serial communication, information for battery residual quantity display from the microcomputer of the battery pack side loaded at the equipment body to perform battery residual quantity display on the basis of the acquired information. Then, the microcomputer of the equipment body side serves to acquire, by serial communication, information for authentication processing from the microcomputer of the battery pack side loaded at the equipment body to perform authentication processing to judge on the basis of the acquired information as to whether or not the battery pack connected to the equipment body is genuine battery pack. The microcomputer of the equipment body side serves to update, after the authentication processing, the content of battery residual quantity display on the basis of information for battery residual quantity display, which is acquired, by serial communication, from the microcomputer of the battery pack side.

Moreover, the present invention is constituted as an electronic equipment comprising an equipment body within which a microcomputer having communication function is mounted, and a battery pack detachably loaded at the equipment body and adapted so that a microcomputer having communication function to perform serial communication to and from the microcomputer of the equipment body side is mounted, the battery pack serving to supply power to the equipment body. When power is turned ON, the electronic equipment to which the present invention is applied serves to first acquire, by serial communication, information for battery residual quantity display from the microcomputer of the battery pack side loaded at the equipment body to perform battery residual quantity display on the basis of the acquired information. Then, the microcomputer of the equipment body side serves to acquire, by serial communication, information for authentication processing from the microcomputer of the battery pack side loaded at the equipment body to perform authentication to judge on the basis of the acquired information as to whether or not the battery pack connected to the equipment body is genuine battery pack, and the microcomputer of the equipment body side serves to update, after the authentication processing, the content of battery residual quantity display on the basis of information for battery residual quantity display, which is acquired, by serial communication, from the microcomputer of the battery pack side.

In the present invention, authentication of the battery is performed to thereby make it impossible to use coarse battery at the set (equipment body), thus making it possible to prevent, in advance, breakage/damage, etc. of equipment body by use of the battery except for normal or genuine battery.

Moreover, in the present invention, since only battery residual quantity display is performed without performing authentication processing of the battery until the remaining usable time can be displayed for a first time, there is no possibility that the function of the residual quantity display of the battery which is merit for user may be damaged by battery authentication processing.

Further, in the present invention, battery residual quantity display processing and battery authentication processing are performed within the same system so that there is no necessity of independently having signal lines between the set and the battery. As a result, reduction of the cost of the hardware can be realized. Further, since it is sufficient to provide communication driver of one system, development cost of the software can be reduced.

Furthermore, in the present invention, the battery authentication processing is divided to perform battery authentication processing in the middle of the residual quantity display processing of the battery so that not only it becomes difficult that a bad-will person such as maker, etc., who prepares coarse battery analyzes a way of performing authentication, but also battery authentication can be performed even if high performance microcomputer is not used. For this reason, the cost is reduced. Further, since battery authentication can be performed even if the microcomputer is not used at a high speed, the power consumption can be reduced.

In addition, in the present invention, since battery authentication result is stored, user can concentrate on battery residual quantity display processing at the second time operation when power is turned ON and operations subsequent thereto. Thus, direct merit with respect to user can be protected.

Still further objects of the present invention and practical merits obtained by the present invention will become more apparent from the embodiments which will be explained below with reference to the attached drawings.

BEST MODE FOR CARRYING OUT THE INVENTION

The embodiments of the present invention will now be described in detail with reference to the attached drawings. It should be noted that the present invention is not limited to the embodiments shown below, but it is a matter of course that changes or modifications may be made as occasion demands within the scope of the knowledge that persons ordinarily skilled in the art have within the scope which does not depart from the gist of the present invention.

Figure 1:
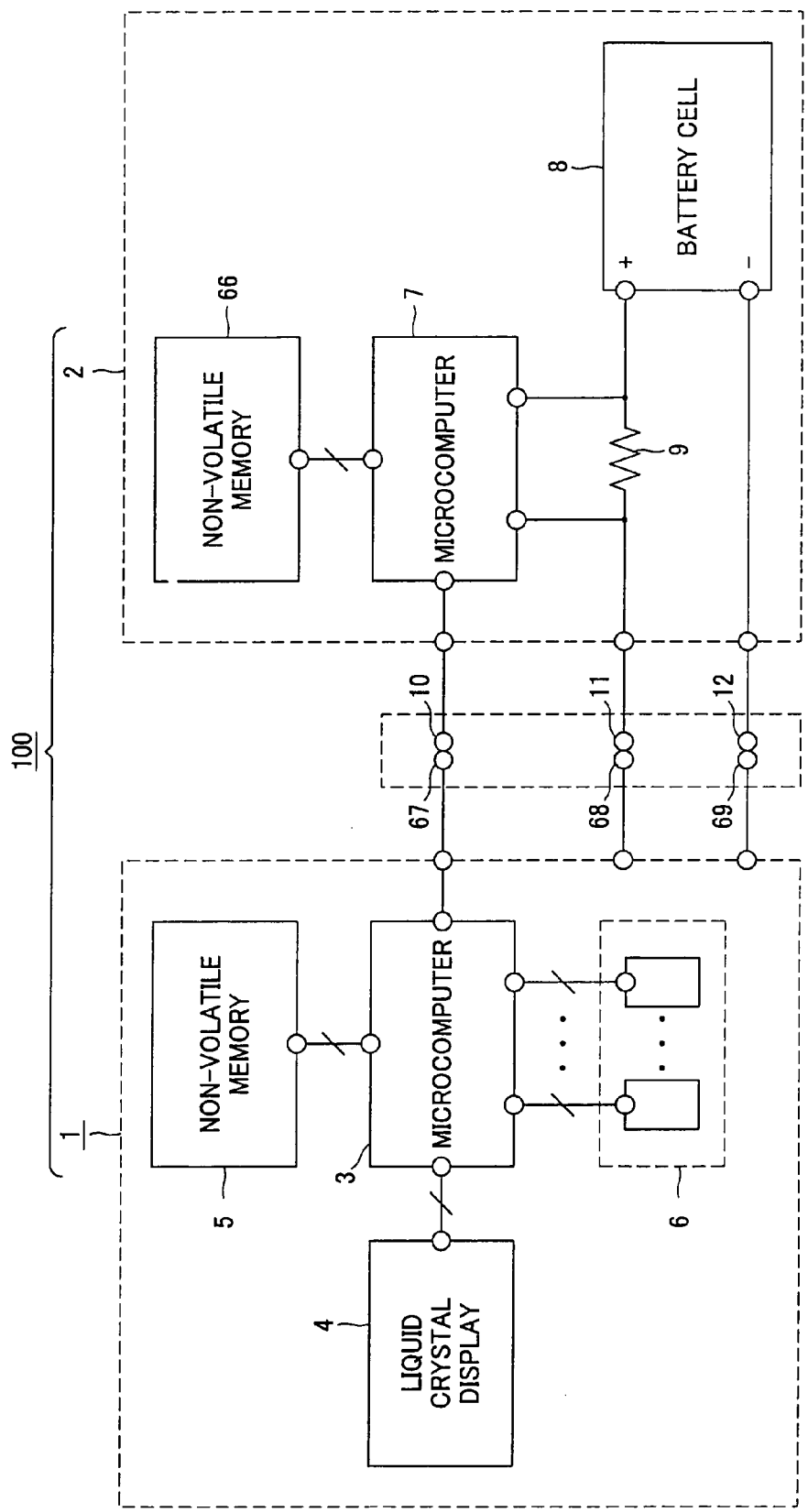
FIG. 1 is a block diagram showing an embodiment of a video camera to which the present invention is applied.

The present invention is applied to, e.g., a video camera 100 having a configuration as shown in FIG. 1. The video camera 100 is composed of a camera body 1, and a battery pack 2 detachably loaded at the camera body 1 and serving to supply power through connection terminals.

At the camera body 1, there are provided a first microcomputer 3, a LCD (Liquid Crystal Display) 4, a non-volatile memory 5, and several other devices 6 necessary for constituting the video camera 100.

The first microcomputer 3 is connected to the LCD 4, the non-volatile memory 5 and other devices 6, and serves to control those components.

Here, while there are lens driver of the image pick-up optical system, imager driver of the image pick-up unit and driver of the recording/reproduction system as other devices 6 necessary for the video camera 100, since those devices are not directly required for explanation of the present invention, detailed explanation thereof will be omitted in the following explanation.

Within the battery box of the camera body 1, there are provided a connection terminal 67 connected to the first microcomputer 3, and a power supply input terminal 68 of the plus side and a power input terminal 69 of the minus side of the camera body 1.

The first microcomputer 3 provided at the camera body 1 can perform serial communication to and from the external via the connection terminal 67.

The battery pack 2 comprises a battery cell 8 such as lithium ion battery, etc., a current detection resistor 9 having one end connected to the cathode (positive electrode) of the battery cell 8, a second microcomputer 7 having both ends connected to the current detection resistor 9, and a non-volatile memory 66 connected to the microcomputer 7.

At the battery pack 2, there are provided a connection terminal 10 connected to the second microcomputer 7, a power supply input terminal 11 of the plus side connected to the cathode of the battery cell 8 through the current detection resistor 9, and a power supply input terminal 12 of the minus side connected to the anode (negative electrode) of the battery cell 8.

The second microcomputer 7 provided at the battery pack 2 can perform serial communication to and from the external via the connection terminal 10.

Further, when the battery pack 2 is inserted into the battery box of the camera body 1, connection terminals 10, 11, 12 of the battery pack 2 side are respectively connected to the connection terminals 67, 68, 69 of the camera body 1 side. As the result of the fact that the connection terminals 11, 12 of the battery pack 2 side are respectively connected to the connection terminals 68, 69 of the camera body 1 side, power is delivered from the battery pack 2 to the camera body 1. Moreover, as the result of the fact that the connection terminal 10 of the battery pack 2 side is connected to the connection terminal 67 of the camera body 1 side, serial communication can be performed between the first microcomputer 3 of the camera body 1 side and the second microcomputer 7 of the battery pack 2 side.

The battery residual quantity display at the video camera 100 is performed in a manner as described below.

Namely, the second microcomputer 7 of the battery pack 2 side serves to measure potential difference across both terminals of the current detection resistor 9 to calculate, at a predetermined period, a current which has flowed into the battery cell 8 and a current which has flowed from the battery cell 8 to integrate current quantities to calculate battery current quantity usable or available at present to grasp the calculated current quantity thus obtained.

Further, the first microcomputer 3 of the camera body 1 side stores, in advance, current consumption value Is of the camera body 1 into the non-volatile memory 5 to acquire current quantity Ia of the battery pack 2 usable at present by serial communication from the battery side microcomputer 7 to calculate remaining usable time Ta of the battery pack 2 by the following formula (1).

$$Ta=Ia/Is \tag{1}$$

to display the calculated remaining usable time Ta on the liquid crystal display 4.

Further, battery authentication at the video camera 100 is performed in a manner as described below.

Namely, the first microcomputer 3 of the camera body 1 side and the second microcomputer 7 of the battery pack 2 side have common certain information. The common information is stored into the non-volatile memory 5 at the camera body 1 side, and is stored into the non-volatile memory 66 at the battery pack 2 side.

Further, the microcomputer 7 of the battery pack 2 side reads out common information from the non-volatile memory 66 to transmit the common information thus obtained to the first microcomputer 3 of the camera body 1 side.

The first microcomputer 3 of the camera body 1 side receives common information, by serial communication, from the second microcomputer 7 of the battery pack 2 side to read out the common information which has been stored in the non-volatile memory 5 of the camera body 1 side to perform comparison with information which has been obtained from the battery pack 2 side, whereby when both information coincide with each other, it is judged that inserted battery is genuine battery pack 2 which can be properly used. The first microcomputer 3 of the camera body 1 side records, into the non-volatile memory 5, information indicating that battery authentication has been completed and information indicating that inserted battery is genuine battery.

Moreover, when both information do not coincide with each other, the first microcomputer 3 of the camera body side 1 is imitated or non-genuine battery. When it is judged that the inserted battery is non-genuine battery, information indicating "Since the battery inserted at present is non-genuine battery, please use genuine battery" is displayed on the liquid crystal display 4, and information indicating that authentication of the battery has been completed and information indicating that the inserted battery pack 2 is not genuine battery are recorded into the non-volatile memory 5. After a predetermined time is passed, power of the camera body 1 is turned OFF.

In the video camera 100, common serial communication lines 13, 14 are used for communication between the first microcomputer 3 of the camera body 1 side and the second computer 7 of the battery pack 2 side.

Further, in the battery residual quantity display processing and the battery authentication processing, data described below is caused to undergo transmission/reception between the first microcomputer 3 of the camera body 1 side and the second microcomputer 7 of the battery pack 2 side.

Namely, in the battery residual quantity display processing, transmission/reception of integrated value of current quantities which have been flowed through the current detection register 9 and plural battery residual quantity correction values are performed.

It is to be noted that, in the battery residual quantity processing, in principle, it is sufficient that the first microcomputer 3 of the camera body 1 side receives only usable current quantity of the battery from the second microcomputer 7 of the battery pack 2 side.

In practice, usable current quantity of the battery pack 2 is not determined only by integrated value of current quantities by the current detection resistor 9. This is because usable current quantity of the battery pack 2 is changed by elements such as voltage at which the camera body 1 is operable, current voltage and/or degree of aging deterioration of the battery pack 2, etc.

In the explanation of the present invention, these elements are called "battery residual quantity correction value".

As "battery residual quantity correction coefficient", there is battery residual quantity correction coefficient in which it is sufficient that transmission/reception is performed only once after communication is started, and there is battery residual quantity correction coefficient in which transmission/reception must be repeatedly performed at a predetermined period. The former communication is called "battery residual quantity display initial communication", and the latter communication is called "battery residual quantity display ordinary communication".

In this embodiment, transmission/reception operations of fourteen number of data are performed as 'battery residual quantity display initial communication', and transmission/reception operations of eighteen number of data are performed as 'battery residual quantity display ordinary communication'.

In the battery authentication processing, transmission/reception operations of plural "information that the camera body 1 side and the battery pack 2 side commonly have" are performed.

If communication of only one "information that the camera body 1 side and the battery pack 2 side commonly have" is performed, "battery authentication" can be made. However, if a person who attempts to prepare non-genuine battery analyzes a method of "battery authentication" to find out one common information, it would be possible to prepare imitated, i.e., non-genuine battery. In view of the above, in the present invention, communicating operations of eight number of communication information is performed to confirm that all common information coincide with each other at the camera body 1 side and the battery 2 side to thereby perform "battery authentication".

It is to be noted that the number of "information that the camera body 1 side and the battery pack 2 side commonly have" is not limited to eight, but may be any number of information.

Moreover, when communication of "information that the camera body 1 side and the battery pack 2 side commonly have" is performed, communication of values after undergone any operation may be performed without performing communication as it is.

Here, software executed at the first microcomputer 3 of the camera body 1 side and the second microcomputer 7 of the battery pack 2 side in the video camera 100 will be explained.

Figure 2:
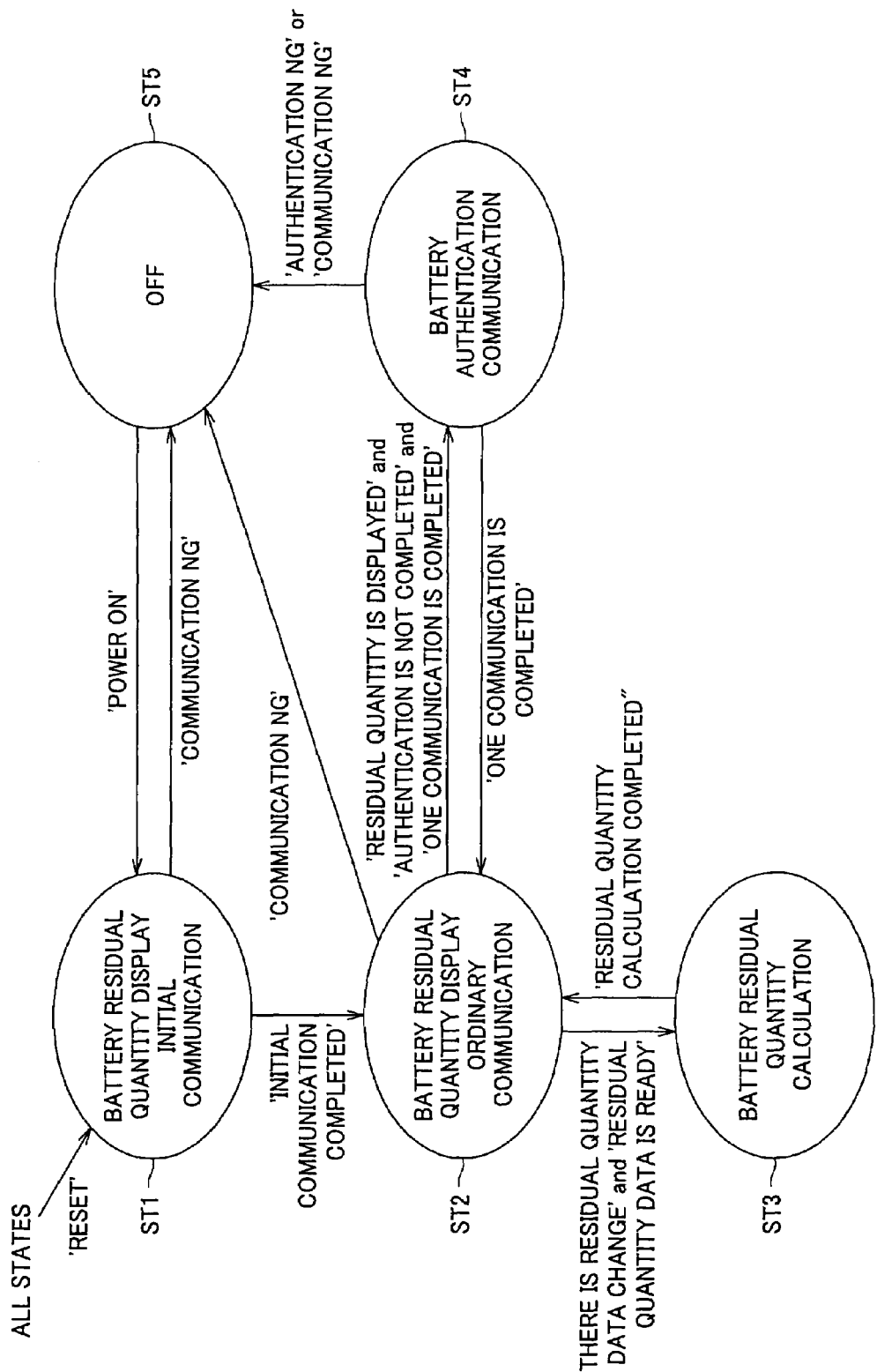
FIG. 2 is a view showing the state transition of software used in the video camera.

The software of this embodiment has following five states, and performs state transition as shown in FIG. 2.

The state ST1 is battery residual quantity display initial communication state. The microcomputer 3 of the camera body 1 side and the microcomputer 7 of the battery pack 2 side perform communication of battery residual quantity correction value in which acquisition is made only once among "battery residual correction values" necessary for residual quantity calculation of the battery. Between the first microcomputer 3 of the camera body 1 side and the second microcomputer 7 of the battery pack 2 side, fourteen times of communications are performed.

Moreover, the state ST2 is battery residual quantity display ordinary communication state. The first microcomputer 3 of the camera body 1 side and the second microcomputer 7 of the battery pack 2 side perform communication of "battery residual quantity correction value" and "integrated value of current quantities by the current detection resistor 9" in which acquisition is periodically necessary among data necessary for residual quantity display of the battery pack 2. Between the first microcomputer 3 of the camera body 1 side and the second microcomputer 7 of the battery pack 2 side, eighteen times of communications are performed.

Further, the state ST3 is battery residual quantity calculation state. The first microcomputer 3 of the camera body 1 side calculates remaining usable time of the battery pack 2 on the basis of "battery residual quantity correction value" and "integrated value of current quantities by the current detection resistor 9" which have been acquired in the battery residual quantity display initial communication state ST1 and the battery residual quantity ordinary communication state ST2 to display the calculated remaining usable time thus obtained on the liquid crystal display 4.

Further, the state ST4 is the battery authentication communication state. The first microcomputer 3 of the camera body 1 side and the second microcomputer 7 of the battery pack 2 side perform communication of "information that the first microcomputer 3 of the camera body 1 side and the second microcomputer 7 of the battery pack 2 side commonly have". Between the first microcomputer 3 of the camera body 1 side and the second microcomputer 7 of the battery pack 2 side, eight number of communications in total are performed.

In addition, the state ST5 is OFF state, wherein notification of "Since battery inserted at present is non-genuine battery, please use genuine battery" is displayed on the liquid crystal display 4. The first microcomputer 3 of the camera body 1 side records, into the non-volatile memory 5, 'Information indicating "Battery authentication" has been completed' and 'Information indicating that inserted battery is not genuine battery'. After a predetermined time is passed, power source of the camera body 1 is turned OFF.

Then, the state transition immediately after reset of the system will be explained in order.

Namely, when the first microcomputer 3 of the camera body 1 side and the second microcomputer 7 of the battery pack 2 side are reset, shift from all states to the battery residual quantity display initial communication state ST1 is performed to perform communication of battery residual quantity correction value in which acquisition is necessary only once among "battery residual quantity correction values" necessary for residual quantity calculation of the battery. Thus, fourteen times of communications are performed between the first microcomputer 3 of the camera body 1 side and the microcomputer 7 of the battery pack 2 side.

Further, when processing of the battery residual quantity display initial communication state ST1 is entirely completed, communication state of the first microcomputer 3 of the camera body 1 side and the second microcomputer 7 of the battery pack 2 side shifts to the battery residual quantity display ordinary communication state ST2. Thus, the first microcomputer 3 of the camera body 1 side and the second microcomputer 7 of the battery pack 2 side perform communication of 'battery residual quantity correction value' and 'integrated value of current quantities by the current detection resistor 9' in which acquisition is periodically required among data necessary for residual quantity display of the battery pack 2. Thus, eighteen times of communications are performed between the first microcomputer 3 of the camera body 1 side and the second microcomputer 7 of the battery pack 2 side.

Then, when processing of the battery residual quantity display ordinary communication state ST2 is entirely completed, communication state of the first microcomputer 3 of the camera body 1 side and the second microcomputer 7 of the battery pack 2 side shifts to the battery residual quantity calculation state ST3. Thus, the first microcomputer 3 of the camera body 1 side calculates remaining usable time of the battery pack 2 on the basis of "battery residual quantity correction value" and "integrated value of current quantities by the current detection resistor 9" which have been acquired in the battery residual quantity display initial communication state ST1 and the battery residual quantity display ordinary communication state ST2 to display the calculated remaining usable time thus obtained on the liquid crystal display 4.

Then, when processing of the battery residual quantity calculation state ST3 is entirely completed, communication state of the first microcomputer 3 of the camera body 1 side and the second microcomputer 7 of the battery pack 2 side shifts to the battery residual quantity display ordinary communication state ST2 to perform communication of "battery residual quantity correction value" or "integrated value of current quantities by the current detection resistor 9" in which acquisition is periodically necessary among data necessary for residual quantity display of the battery pack 2. Only one communication is performed between the first microcomputer 3 of the camera body 1 side and the microcomputer 7 of the battery pack 2 side.

Then, when only one communication is completed between the first microcomputer 3 of the camera body 1 side and the second microcomputer 7 of the battery pack 2 side in the battery residual quantity display ordinary communication state ST2, communication state of the first microcomputer 3 of the camera body 1 side and the second microcomputer 7 of the battery pack 2 side shifts to the battery authentication communication state ST4 to perform communication of 'information that the first microcomputer 3 of the camera body 1 side and the second microcomputer 7 of the battery pack 2 side commonly have'. Thus, only one communication is performed between the first microcomputer 3 of the camera body 1 side and the second microcomputer 7 of the battery pack 2 side.

Then, when only one communication is completed between the first microcomputer 3 of the camera body 1 side and the second microcomputer 7 of the battery pack 2 side in the battery authentication communication state ST4, communication state of the first microcomputer 3 of the camera body 1 side and the second microcomputer 7 of the battery 2 side shifts to the battery residual quantity display ordinary communication state ST2 to perform communication of 'battery residual quantity correction value' or 'integrated value of current quantities by the current detection resistor 9' in which acquisition is periodically necessary among data necessary for residual quantity display of the battery pack 2. Thus, only one communication is performed between the first microcomputer 3 of the camera body 1 side and the second microcomputer 7 of the battery pack 2 side.

Further, the first microcomputer 3 of the camera body 1 side and the second microcomputer 7 of the battery pack 2 side repeat the state transition from the battery residual quantity display ordinary communication state ST2 to the battery authentication communication state ST4 and the state transition from the battery authentication communication state ST4 to the battery residual quantity display ordinary communication state ST2 until eight number of communications in total of "information that the first microcomputer 3 of the camera body 1 side and the second microcomputer 7 of the battery pack 2 side commonly have" are completed in the battery authentication communication state ST4.

Then, when eight number of communications in total of "information that the first microcomputer 3 of the camera body 1 side and the second microcomputer 7 of the battery pack 2 side commonly have" are completed in the battery authentication communication state ST2, the first microcomputer 3 of the camera body 1 side and the second microcomputer 7 of the battery pack 2 side read out common information stored in the non-volatile memory 5 of the camera body 1 side to perform comparison with information obtained from the second microcomputer 7 of the battery pack 2 side.

Then, when both information coincide with each other, the first microcomputer 3 of the camera body 1 side judges that inserted battery is genuine battery. On the contrary, when both information do not coincide with each other, the first microcomputer 3 of the camera body 1 side judges that inserted battery is non-genuine battery.

Further, in the case where it is judged that inserted battery is genuine battery, the first microcomputer 3 of the camera body 1 side records, into the non-volatile memory 5, 'information indicating that "battery authentication" has been completed' and 'information indicating that inserted battery is genuine battery'. Thereafter, communication state shifts to the battery residual quantity display ordinary communication state ST2. At times subsequent thereto, the first microcomputer 3 of the camera body 1 side and the second microcomputer 7 of the battery pack 2 side perform only communication of 'battery residual quantity correction value' or 'integrated value of current quantities by the current detection resistor 9'. In the case where there is no change in value of 'battery residual quantity correction value' or 'integrated value of current quantities by the current detection resistor 9', the communication state remains in the battery residual quantity display ordinary communication state ST2. In the case where there takes place change in value of 'battery residual quantity correction value' or 'integrated value of current quantities by the current detection resistor 9', the communication state shifts to the battery residual quantity calculation state ST3 to calculate, for a second time, remaining usable time of the battery pack 2 to update display of the liquid crystal display 4.

Further, in the case where it is judged that inserted battery is non-genuine battery, the communication state of the first microcomputer 3 of the camera side 1 shifts to the OFF state ST5 to display, on the liquid crystal display 4, notification of 'Since battery inserted at present is non-genuine battery, please use genuine battery', and to record, into the non-volatile memory 5, 'information indicating that "battery authentication" has been completed' and 'information indicating that inserted battery is not genuine battery' to turn power source of the camera body 1 OFF after a predetermined time is passed.

Then, the processing executed at the first microcomputer 3 of the camera body 1 side and the second microcomputer 7 of the battery pack 2 side in the video camera 100 will be explained with reference to the flowchart shown in FIG. 3.

Namely, in the video camera 100, when power of the camera body 1 is turned ON, the first microcomputer 3 of the camera body 1 side and the second microcomputer 7 of the battery pack 2 side are first placed in the battery residual quantity display initial communication state ST1 to perform fourteen number of communications of 'battery residual quantity correction value' (steps SA1~SA14, steps SB1~SB14).

Then, the first microcomputer 3 of the camera body 1 side and the second microcomputer 7 of the battery pack 2 side are placed in battery residual quantity display ordinary communication state ST2 to perform eighteen number of communications of 'battery residual quantity correction value' (steps SA15~SA32, steps SB15~SB32).

Then, the first microcomputer 3 of the camera body 1 side calculates remaining usable time of the battery pack 2 on the basis of acquired (14+18)=32 number of 'battery residual quantity correction values' (step SA33).

Then, the first microcomputer 3 of the camera body 1 side displays remaining usable time of the battery pack 2 on the liquid crystal display 4 (step SA 34).

Then, the first microcomputer 3 of the camera body 1 side and the second microcomputer 7 of the battery pack 2 side are placed in the battery residual quantity display ordinary communication state ST1 to perform only one 'battery residual quantity correction value' (steps SA35, SB33).

Then, the first microcomputer 3 of the camera body 1 side and the second microcomputer 7 of the battery pack 2 side are placed in the battery authentication communication state ST4 to perform communication of only one 'information that the set side and the battery side commonly have' (steps SA36, SB34).

Further, the first microcomputer 3 of the camera body 1 side and the second microcomputer 7 of the battery pack 2 side repeat (steps SA35~SA36, steps SB33~SB34) until communications of eight number of 'information that the set side and the battery side commonly have' in total are completed in the battery authentication communication state ST4.

Then, the first microcomputer 3 of the camera body 1 side reads out common information stored in the non-volatile memory 5 of the camera body 1 side to compare the common information thus read out with information obtained from the second microcomputer 7 of the battery pack 2 side (step SA37).

Further, when the both information coincide with each other, the first microcomputer 3 of the camera body 1 side judges that inserted battery is genuine battery to record, into the non-volatile memory 5, 'information indicating that "battery authentication" has been completed', and 'information indicating that inserted battery is genuine battery' (step SA38). Thereafter, there results 'battery residual quantity display ordinary communication state (ST2) to perform only communication of 'battery residual quantity correction value'.

Moreover, when the both information do not coincide with each other, the first microcomputer 3 of the camera body 1 side judges that inserted battery is non-genuine battery thereafter to display, on the liquid crystal display 4, notification of 'Since battery inserted at present is non-genuine battery, please use genuine battery', and to record, into the non-volatile memory 5, 'information indicating that "battery authentication" has been completed' and 'information indicating that inserted battery is not genuine battery' to turn power source of the camera body 1 OFF after a predetermined time is passed (step SA39).

Figure 3:
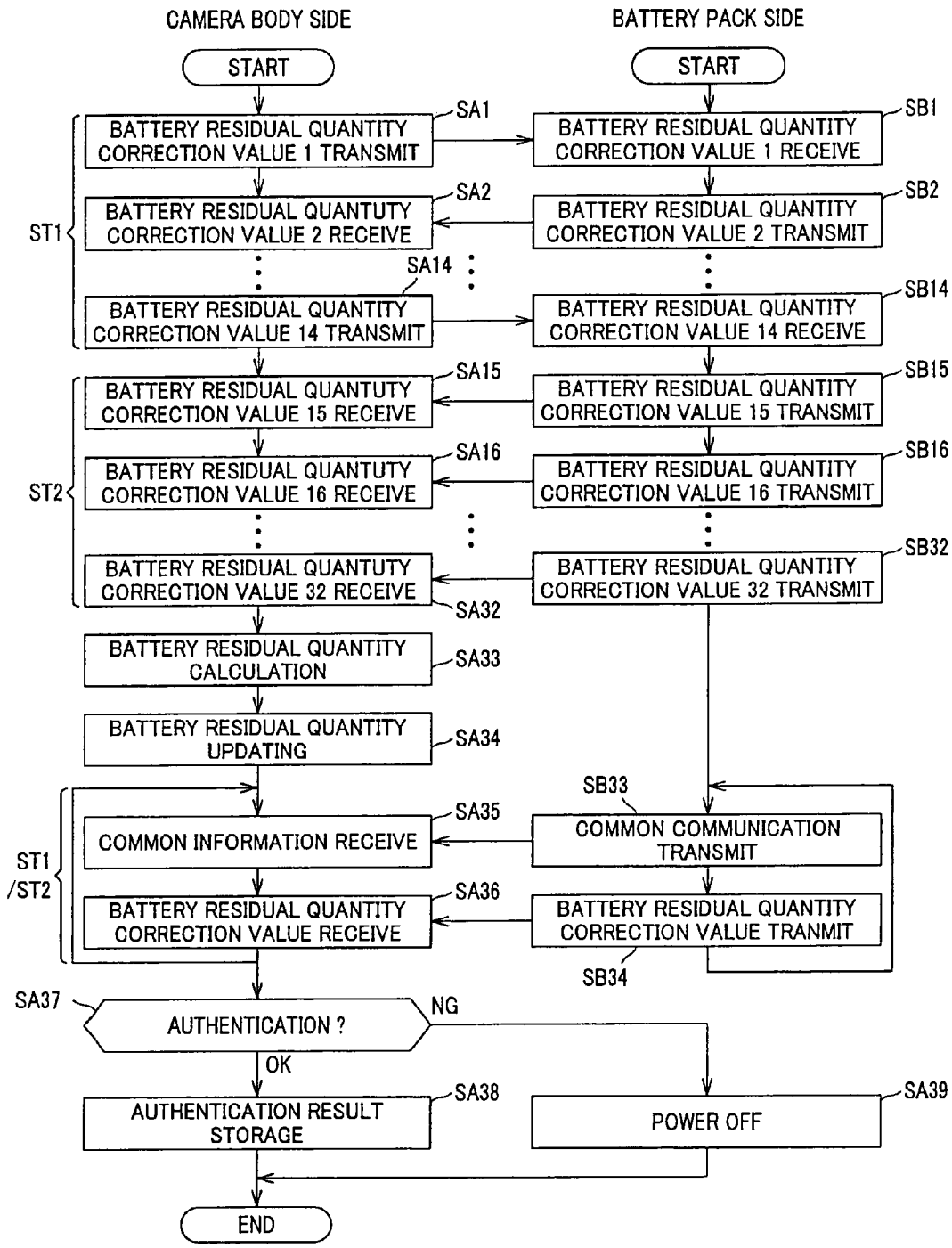
FIG. 3 is a flowchart showing processing executed at microcomputer of the camera body side and microcomputer of the battery pack side which constitute the video camera.

In the video camera 100, processing shown in the flowchart of FIG. 3 is executed by the first microcomputer 3 of the camera body 1 side and the second microcomputer 7 of the battery pack 2 side. Thus, when power of the equipment body 1 is turned ON as indicated by the timing chart shown at (A) in FIG. 4, there first results battery residual quantity display ordinary communication state ST2 via the battery residual quantity display initial communication state ST1. Thus, remaining usable time of the battery is first displayed on the liquid crystal display 4. Thereafter, transition between the battery authentication communication state ST4 and the battery residual quantity display ordinary communication state ST2 is alternately performed. When the authentication processing is completed, the battery residual quantity display ordinary communication state ST2 repeats so that the content of the battery residual quantity display is updated.

Figure 4A:
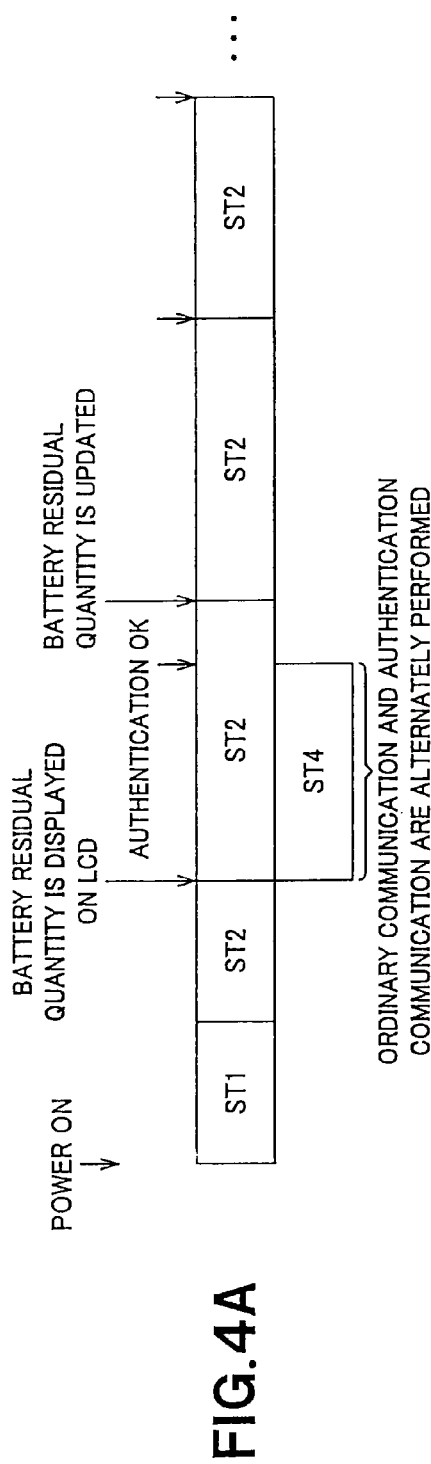
FIG. 4 is a time chart showing how state shifts with respect to elapsed time in the processing by the method of the present invention and the conventional method.
Figure 4B:
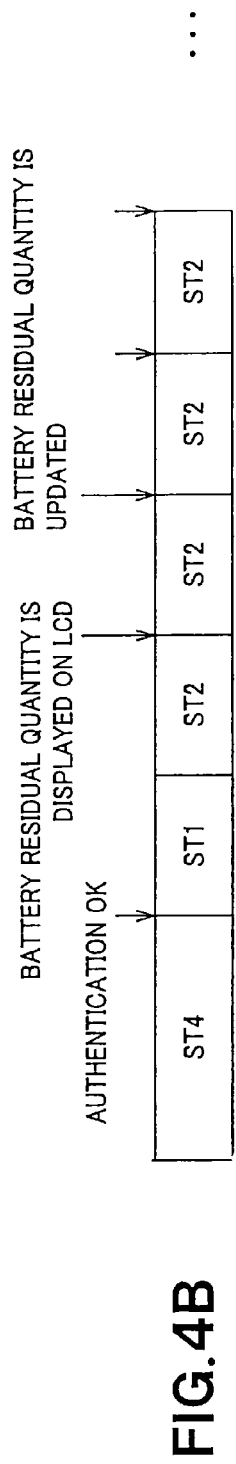
Figure 4C:
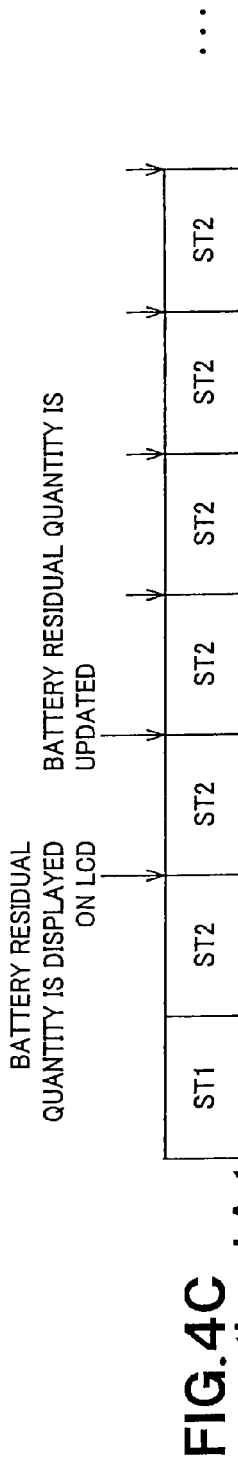

Here, in the conventional battery authentication method of first performing battery authentication as indicated by the timing chart shown at (B) in FIG. 4, as compared to the conventional case of performing only battery residual quantity display as indicated by the timing chart shown at (C) in FIG. 4, time at which remaining usable time of the battery is first displayed is delayed by the time of the battery authentication communication state ST4. On the contrary, in this video camera 100, since battery residual quantity display is first performed thereafter to perform authentication processing, there is no delay in time at which remaining usable time of the battery is first displayed as compared to the case of performing only battery residual quantity display.

Namely, in the video camera 100 to which the present invention is applied, since only battery residual quantity display processing is performed at first to perform battery authentication processing after remaining usable time is displayed on the liquid crystal display 4, the time required when remaining usable time is displayed at first is not changed even if battery authentication processing is supplemented. Thus, there is no possibility that the function of the battery residual quantity display which is advantageous to user may be injured by the battery authentication processing.

As stated above, in the video camera 100 to which the present invention is applied, even when battery authentication is performed, the time at which remaining usable time of the battery, which is directly advantageous to user, is displayed at first is not sacrificed.

Moreover, in the video camera 100, since battery authentication is performed in parallel to battery residual quantity display, it becomes impossible to use coarse battery which is not genuine battery. Thus, it is possible to prevent, in advance, breakage/damage, etc. of the equipment body 1 by use of battery pack except for genuine battery.

Further, in the video camera 100, since both the battery residual quantity display and the battery authentication are performed with the processing being subject to time-division by using the communication system of the first microcomputer 3 of the camera body 1 side and the second microcomputer 7 of the battery pack 2 side, it is sufficient to use communication line of one system. Thus, the cost of the hardware can be reduced.

Furthermore, in the video camera 100, the battery residual quantity display processing and the battery authentication processing are performed within the same system so that it is sufficient that communication driver of the system is employed. Thus, development cost of software can be reduced.

Still further, in the video camera 100, the battery authentication is divided to perform battery authentication processing in the middle of the battery residual quantity display processing. Thus, a bad-will person such as maker which manufactures coarse batteries, etc. makes it difficult to analyze a method of performing authentication.

Still more further, in the video camera 100, since the battery authentication processing is divided, it is possible to perform battery authentication even if high performance microcomputer is not used. For this reason, the cost can be reduced.

Further, in the video camera 100, since the battery authentication processing is divided, it is possible to perform battery authentication even if microcomputer is not used at a high speed. For this reason, power consumption can be reduced.

Furthermore, in the video camera 100, since battery authentication result is stored, user can concentrate on the battery residual quantity display processing from the second time when power is turned ON and time subsequent thereto. Advantages to user can be protected.

In addition, since the video camera 100 can be used immediately after battery authentication, time at the time of battery exchange can be shortened particularly in such image pick-up apparatus, e.g., video camera 100 and/or digital still camera. As a result, there is a little possibility that user may escape photographing chance. Thus, user can advantageously continue photographing.

The invention claimed is:

1. A battery pack detachably connectable to an equipment body to supply power to the equipment body, the battery pack comprising:
   a battery cell;
   a microcomputer configured to communicate with the equipment body;
   a connection terminal connected to the microcomputer;
   a positive power supply input terminal connected to a cathode of the battery cell; and
   a negative power supply input terminal connected to an anode of the battery cell,
   wherein, after the power of the equipment body is turned on, the microcomputer is configured to alternately send to the equipment body by serial communication via the connection terminal information to be used in authentication processing executed by the equipment body and information to be used in a battery residual quantity count executed by the equipment body, the microcomputer is configured to repeat alternately sending to the equipment body the information for authentication processing and the information to be used in the battery residual quantity count a plurality of times, and after the authentication processing is complete, the microcomputer is configured to send to the equipment body information to be used in updating the battery residual quantity count executed by the equipment body.

2. The battery pack according to claim 1, wherein the microcomputer is configured to repeat alternately sending to the equipment body the information for authentication processing and the information to be used in the battery residual quantity count eight times.

3. The battery pack according to claim 1, wherein, after the authentication processing is complete, the microcomputer is configured to only send to the equipment body information to be used in updating the battery residual quantity count executed by the equipment body.

4. A microcomputer having a communication function used for a battery pack detachably loaded to an equipment body, the microcomputer comprising:
 a connector connected to a connection terminal of the battery pack,
 wherein, after the power of the equipment body is turned on, the microcomputer is configured to alternately send to the equipment body by serial communication via the connection terminal information to be used in authentication processing executed by the equipment body and information to be used in a battery residual quantity count executed by the equipment body, the microcomputer is configured to repeat alternately sending to the equipment body the information for authentication processing and the information to be used in the battery residual quantity count a plurality of times, and
 after the authentication processing is complete, the microcomputer is configured to send to the equipment body information to be used in updating the battery residual quantity count executed by the equipment body.

5. The microcomputer according to claim 4, wherein the microcomputer is configured to repeat alternately sending to the equipment body the information for authentication processing and the information to be used in the battery residual quantity count eight times.

6. The microcomputer according to claim 4, wherein, after the authentication processing is complete, the microcomputer is configured to only send to the equipment body information to be used in updating the battery residual quantity count executed by the equipment body.

7. An electronic device comprising:
 an equipment body; and
 a battery pack detachably connectable to the equipment body to supply power to the equipment body, the battery pack including,
 a battery cell;
 a microcomputer configured to communicate with the equipment body;
 a connection terminal connected to the microcomputer;
 a positive power supply input terminal connected to a cathode of the battery cell; and
 a negative power supply input terminal connected to an anode of the battery cell,
 wherein, after the power of the equipment body is turned on, the microcomputer is configured to alternately send to the equipment body by serial communication via the connection terminal information to be used in authentication processing executed by the equipment body and information to be used in a battery residual quantity count executed by the equipment body, the microcomputer is configured to repeat alternately sending to the equipment body the information for authentication processing and the information to be used in the battery residual quantity count a plurality of times, and
 after the authentication processing is complete, the microcomputer is configured to send to the equipment body information to be used in updating the battery residual quantity count executed by the equipment body.

8. The electronic device according to claim 7, wherein the microcomputer is configured to repeat alternately sending to the equipment body the information for authentication processing and the information to be used in the battery residual quantity count eight times.

9. The electronic device according to claim 7, wherein, after the authentication processing is complete, the microcomputer is configured to only send to the equipment body information to be used in updating the battery residual quantity count executed by the equipment body.

10. The electronic device according to claim 7, wherein the equipment body is a video camera.

11. An equipment body of an electronic device detachably connectable to a battery pack configured to supply power to the equipment body, the equipment body comprising:
 a microcomputer configured to communicate with the battery pack and to perform authentication processing and a battery residual quantity count;
 a connection terminal connected to the microcomputer;
 wherein, after the power of the equipment body is turned on, the microcomputer is configured to alternately receive from the battery pack by serial communication via the connection terminal information to be used in the authentication processing and information to be used in the battery residual quantity count, the microcomputer is configured to repeat alternately sending to the equipment body the information for authentication processing and the information to be used in the battery residual quantity count a plurality of times, and
 after the authentication processing is complete, the microcomputer is configured to receive from the battery pack information to be used in updating the battery residual quantity count.

12. The equipment body according to claim 11, wherein the microcomputer is configured to repeat alternately receiving from the battery pack the information for authentication processing and the information to be used in the battery residual quantity count eight times.

13. The equipment body according to claim 11, wherein, after the authentication processing is complete, the microcomputer is configured to only receive from the battery pack information to be used in updating the battery residual quantity count.

14. The equipment body according to claim 11, wherein the equipment body is a video camera.

* * * * *